United States Patent
Poon et al.

(10) Patent No.: US 8,777,567 B2
(45) Date of Patent: Jul. 15, 2014

(54) TURBINE BLADES, TURBINE ASSEMBLIES, AND METHODS OF MANUFACTURING TURBINE BLADES

(75) Inventors: Kin Poon, Tempe, AZ (US); Malak Fouad Malak, Tempe, AZ (US); Ardeshir Riahi, Scottsdale, AZ (US); David Chou, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 476 days.

(21) Appl. No.: 12/888,202

(22) Filed: Sep. 22, 2010

(65) Prior Publication Data

US 2012/0070307 A1 Mar. 22, 2012

(51) Int. Cl.
*F01D 5/20* (2006.01)
*F01D 5/18* (2006.01)

(52) U.S. Cl.
USPC .......................................... 416/92; 416/97 R

(58) Field of Classification Search
USPC ............. 415/173.1, 173.2, 173.3, 173.4, 914; 416/92, 229, 235, 236 R, 97 R; 29/889.7, 889.721
See application file for complete search history.

(56) References Cited

U.S. PATENT DOCUMENTS

| | | | |
|---|---|---|---|
| 4,390,320 A | 6/1983 | Eiswerth | |
| 4,529,357 A | 7/1985 | Holland | |
| 4,589,823 A | 5/1986 | Koffel | |
| 5,039,562 A | 8/1991 | Liang | |
| 5,192,192 A | 3/1993 | Ourhaan | |
| 5,282,721 A | 2/1994 | Kildea | |
| 5,688,107 A | 11/1997 | Downs et al. | |
| 5,733,102 A * | 3/1998 | Lee et al. | 416/97 R |
| 6,179,556 B1 | 1/2001 | Bunker | |
| 6,190,129 B1 | 2/2001 | Mayer et al. | |
| 6,231,307 B1 | 5/2001 | Correia | |

(Continued)

FOREIGN PATENT DOCUMENTS

| | | |
|---|---|---|
| EP | 1281837 A1 | 2/2003 |
| EP | 1422383 A2 | 5/2004 |

(Continued)

OTHER PUBLICATIONS

EP Search Report, EP 11174595.6-2321 dated May 10, 2011.

(Continued)

*Primary Examiner* — Edward Look
*Assistant Examiner* — William Grigos
(74) *Attorney, Agent, or Firm* — Ingrassia Fisher & Lorenz, P.C.

(57) ABSTRACT

A turbine blade includes a first side wall including a first tip edge, a second side wall opposite the first side wall and including a second tip edge, a tip wall between the first and second side walls, the tip wall recessed from the first tip edge of the first side wall and the second tip edge of the second side wall forming a coolant cavity, a tip recess cavity, a first parapet wall on the first side wall, and a second parapet wall on the second side wall, the coolant cavity defined by the tip wall, and the tip recess cavity defined by the tip wall, and the first and second parapet walls, a step formed between the first tip edge and the tip wall, a cooling hole through the first parapet wall, the step, and the tip wall, the cooling hole including an open and a closed channel section.

20 Claims, 8 Drawing Sheets

(56) References Cited

U.S. PATENT DOCUMENTS

| | | | |
|---|---|---|---|
| 6,422,821 | B1 | 7/2002 | Lee et al. |
| 6,478,535 | B1 | 11/2002 | Chung et al. |
| 6,494,678 | B1 | 12/2002 | Bunker |
| 6,527,514 | B2 | 3/2003 | Roeloffs |
| 6,602,052 | B2 | 8/2003 | Liang |
| 6,634,860 | B2 | 10/2003 | Lee et al. |
| 6,672,829 | B1 | 1/2004 | Cherry et al. |
| 6,790,005 | B2 | 9/2004 | Lee et al. |
| 6,981,846 | B2 | 1/2006 | Liang |
| 6,994,514 | B2 * | 2/2006 | Soechting et al. ............ 415/115 |
| 7,192,250 | B2 | 3/2007 | Boury et al. |
| 7,351,035 | B2 | 4/2008 | Deschamps et al. |
| 7,473,073 | B1 | 1/2009 | Liang |
| 7,494,319 | B1 | 2/2009 | Liang |
| 7,510,376 | B2 * | 3/2009 | Lee et al. .................... 416/97 R |
| 7,530,788 | B2 * | 5/2009 | Boury et al. ................... 416/92 |
| 7,591,070 | B2 | 9/2009 | Lee |
| 7,695,248 | B2 | 4/2010 | Mons et al. |
| 7,857,587 | B2 | 12/2010 | Correia et al. |
| 7,922,451 | B1 | 4/2011 | Liang |
| 7,972,115 | B2 | 7/2011 | Potier |
| 8,061,987 | B1 * | 11/2011 | Liang ............................. 416/92 |
| 8,075,268 | B1 | 12/2011 | Liang |
| 8,092,178 | B2 | 1/2012 | Marini et al. |
| 8,113,779 | B1 * | 2/2012 | Liang ............................. 416/92 |
| 8,182,221 | B1 | 5/2012 | Liang |
| 8,246,307 | B2 | 8/2012 | Cheong et al. |
| 8,366,394 | B1 | 2/2013 | Liang |
| 8,414,265 | B2 | 4/2013 | Willett, Jr. |
| 8,435,004 | B1 | 5/2013 | Liang |
| 2002/0197159 | A1 * | 12/2002 | Roeloffs ........................ 416/92 |
| 2003/0021684 | A1 * | 1/2003 | Downs et al. .................. 416/92 |
| 2005/0232771 | A1 | 10/2005 | Harvey et al. |
| 2006/0120869 | A1 | 6/2006 | Wilson et al. |
| 2007/0237637 | A1 | 10/2007 | Lee et al. |
| 2008/0118363 | A1 | 5/2008 | Lee et al. |
| 2009/0148305 | A1 | 6/2009 | Riahi et al. |
| 2010/0135822 | A1 | 6/2010 | Marini et al. |
| 2010/0221122 | A1 | 9/2010 | Klasing et al. |
| 2012/0201695 | A1 | 8/2012 | Little |

FOREIGN PATENT DOCUMENTS

| | | |
|---|---|---|
| EP | 1726783 A1 | 11/2006 |
| EP | 1736636 A1 | 12/2006 |
| EP | 2434097 A1 | 3/2012 |

OTHER PUBLICATIONS

Kwak, JS, et al.; Heat Transfer Coefficients and Film Cooling Effectiveness on the Squealer Tip of a Gas Turbine Blade; Turbine Heat Transfer Laboratory, Department of Mechanical Engineering, Texas A&M University, vol. 125, Oct. 2003, Transactions of the ASME, [Retrieved from Internet Jul. 10, 2013] [http://turbomachinery.asmedigitalcollection.asme.org].

Ahn, J, et al.; Film-Cooling Effectiveness on a Gas Turbine Blade Tip Using Pressure-Sensitive Paint; Turbine Heat Transfer Laboratory, Department of Mechanical Engineering, Texas A&M University, Journal of Heat Transfer, vol. 127, May 2005, [Retrieved from Internet Jul. 10, 2013] [http://heattransfer.asmedigitalcollection.asme.org].

* cited by examiner

TURBINE BLADES, TURBINE ASSEMBLIES, AND METHODS OF MANUFACTURING TURBINE BLADES

STATEMENT REGARDING FEDERALLY SPONSORED RESEARCH OR DEVELOPMENT

This inventive subject matter was made with Government support under USAF F33615-03-D-2355 awarded by the United States Air Force. The Government has certain rights in this inventive subject matter.

TECHNICAL FIELD

The inventive subject matter generally relates to turbine assemblies, and more particularly relates to turbine blades for turbine assemblies.

BACKGROUND

Gas turbine engines, such as turbofan gas turbine engines, may be used to power various types of vehicles and systems, such as, for example, aircraft. Typically, these engines include turbine blades that are impinged on by high-temperature compressed air that causes a turbine of the engine to rotate at a high speed. Consequently, the blades are subjected to high heat and stress loadings which, over time, may reduce their structural integrity.

To improve blade structural integrity, a blade cooling scheme is typically incorporated into the turbines. The blade cooling scheme directs cooling air through an internal cooling circuit formed in the blade to maintain blade temperatures within acceptable limits. The internal cooling circuit may include a simple channel extending through a length of the blade or may consist of a series of connected, serpentine cooling passages, which incorporate raised or depressed structures therein. The serpentine cooling passages increase the cooling effectiveness by extending the length of the air flow path. In this regard, the blade may have multiple internal walls that form the intricate cooling passages through which the cooling air flows. The cooling passages then direct the cooling air to openings on a tip and a trailing edge of the blade.

As the desire for increased engine efficiency continues to rise, engine components are increasingly being subjected to higher and higher operating temperatures. For example, newer engine designs may employ operating temperatures that are over 1100° C. However, current engine components, such as the blades, may not be adequately designed to withstand such temperatures. In particular, the blade tip may abrade against an inner surface of a surrounding shroud, and as a result, the openings providing an outlet for the cooling air in the blade tip may become filled with the blade material. Hence, the blade may not be cooled as desired.

Accordingly, it is desirable to have a blade with an improved manner for cooling the blade tip. Additionally, it is desirable for the blade to maintain coolant flow during engine operation. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

In an embodiment, by way of example only, a turbine blade includes a first side wall including a first tip edge, a second side wall opposite the first side wall and including a second tip edge, a tip wall extending between the first side wall and the second side wall, the tip wall being recessed from the first tip edge of the first side wall and the second tip edge of the second side wall to form a coolant cavity, a tip recess cavity, a first parapet wall on the first side wall, and a second parapet wall on the second side wall, the coolant cavity defined in part by an interior surface of the tip wall, and the tip recess cavity defined, in part, by a surface of the tip wall, the first parapet wall, and the second parapet wall, a step formed between the first tip edge and the tip wall, a cooling hole extending through the first parapet wall, the step, and the tip wall, the cooling hole including an open channel section and a closed channel section, the open channel section extending from the first tip edge of the parapet wall to the step, and the closed channel section extending through the step and the tip wall.

In another embodiment, by way of example only, a turbine rotor includes a rotor and a plurality of blades extending radially outwardly from the rotor. Each blade comprises a first side wall including a first tip edge, a second side wall opposite the first side wall and including a second tip edge, a tip wall extending between the first side wall and the second side wall, the tip wall being recessed from the first tip edge of the first side wall and the second tip edge of the second side wall to form a coolant cavity, a tip recess cavity, a first parapet wall on the first side wall, and a second parapet wall on the second side wall, the coolant cavity defined in part by an interior surface of the tip wall, and the tip recess cavity defined, in part, by a surface of the tip wall, the first parapet wall, and the second parapet wall, a step formed between the first tip edge and the tip wall, and a cooling hole extending through the first parapet wall, the step, and the tip wall, the cooling hole including an open channel section and a closed channel section, the open channel section extending from the first tip edge of the parapet wall to the step, and the closed channel section extending through the step and the tip wall.

In another embodiment, by way of example only, a method of manufacturing a blade includes casting a blade including a first side wall including a first tip edge, a second side wall opposite the first side wall and including a second tip edge, and a tip wall extending between the first side wall and the second side wall, the tip wall being recessed from the first tip edge of the first side wall and the second tip edge of the second side wall to form a coolant cavity, a tip recess cavity, a first parapet wall on the first side wall, and a second parapet wall on the second side wall, the coolant cavity defined in part by an interior surface of the tip wall, and the tip recess cavity defined, in part, by a surface of the tip wall, the first parapet wall, and the second parapet wall, forming a step between the first tip edge and the tip wall, and machining a cooling hole into the blade, wherein the cooling hole extends through the first parapet wall, the step, and the tip wall, the cooling hole includes an open channel section and a closed channel section, the open channel section extends from the first tip edge of the parapet wall to the step, and the closed channel section extends through the step and the tip wall.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

An improved turbine blade is provided that is capable of withstanding temperature environments that are higher than those for which conventional turbine blades are designed. Generally, the improved turbine blade includes a first side wall including a first tip edge, a second side wall opposite the first side wall and including a second tip edge, and a tip wall extending between the first side wall and the second side wall, the tip wall being recessed from the first tip edge of the first side wall and the second tip edge of the second side wall to form a coolant cavity, a tip recess cavity, a first parapet wall on the first side wall, and a second parapet wall on the second side wall, the coolant cavity defined in part by an interior surface of the tip wall, and the tip recess cavity defined, in part, by an exterior surface of the tip wall, the first parapet wall, and the second parapet wall. To provide improved cooling, the turbine blade further includes a step formed between the first tip edge and the tip wall, the step extending along a majority of a length of the first tip edge of the first side wall, and a cooling hole having a centerline extending from the first parapet wall, through the step, and through the tip wall, the continuous cooling hole including an open channel section and a closed channel section, the open channel section extending from the first tip edge of the parapet wall to the step, and the closed channel section extending through the step and the tip wall. The improved turbine blade may be implemented into turbine assemblies for turbine engines or for other turbine applications.

Figure 1:
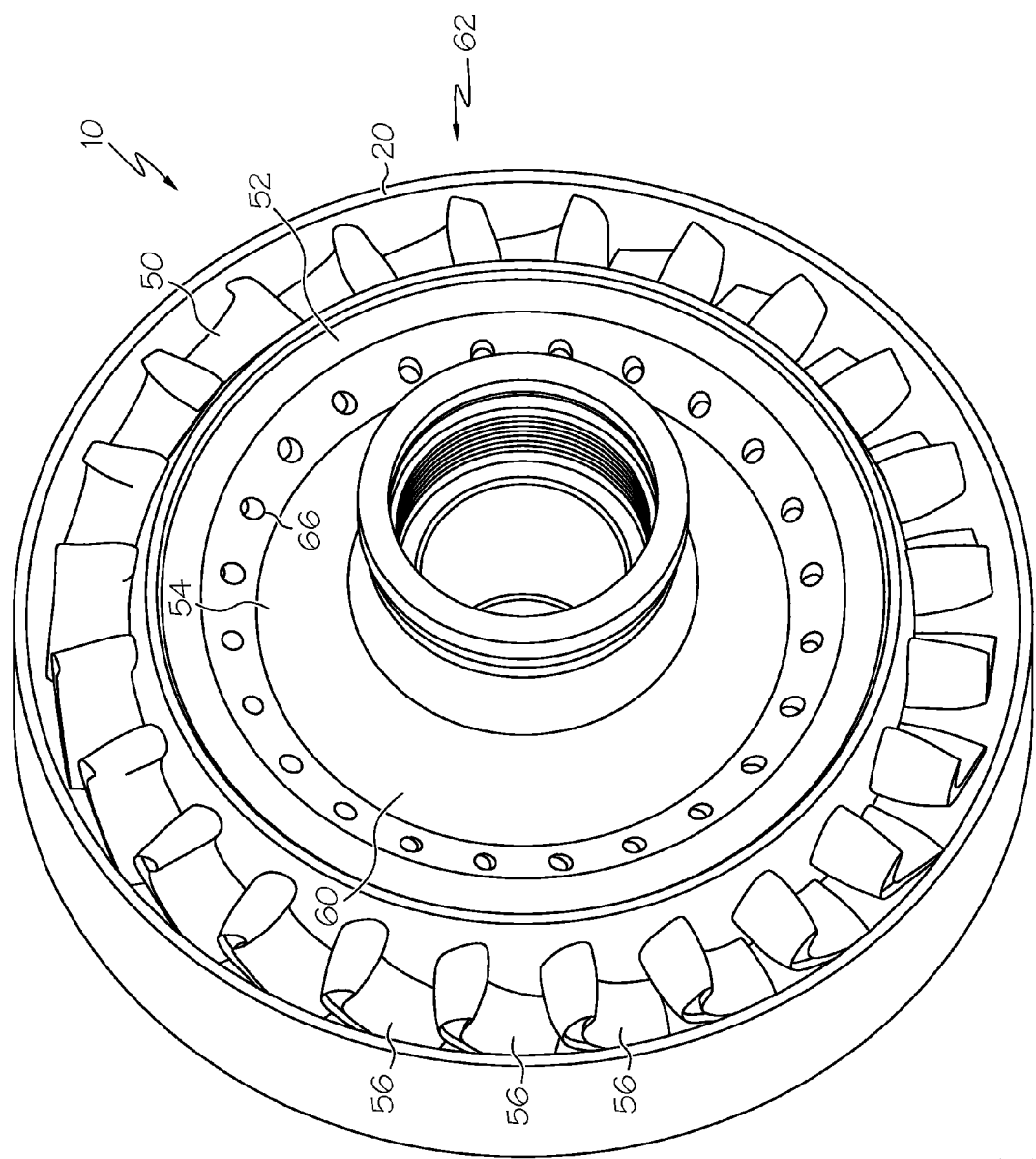
FIG. 1 is a perspective, side view of a turbine assembly, according to an embodiment.

FIG. 1 is a perspective, side view of a turbine assembly 10 within which the improved turbine blade may be implemented, according to an embodiment. The turbine assembly 10 includes a stator 20 surrounding a rotor 50. The stator 20, configured as a cylindrical shroud, is disposed concentric to the rotor 50 to optimize aerodynamic efficiency and forms a radial gap (i.e., blade running clearance) with an outermost diameter of the rotor 50. The radial gap is typically very small, for example, in a range of about 0.25 millimeter (mm) to about 0.50 mm. In other embodiments, the radial gap may be larger or smaller than the aforementioned range.

The rotor 50 includes a blade ring 52, a disk 54, and a plurality of blades 56. The blade ring 52 and the disk 54 are bonded together and may be made of similar or different materials, in an embodiment. In another embodiment, the blade ring 52 is inserted into the disk 54 through a disk attachment mechanism. Suitable materials that may be used for manufacturing the blade ring 52 and/or the disk 54 include, but are not limited to superalloys, such as nickel-based superalloys, that are equi-axed, uni-directional, or single crystal. The uni-directional and single crystal materials may each have a preferential crystal orientation.

The blade ring 52 has a plurality of inlets 66 for receiving air for cooling the blades 56. The inlets 66 communicate with coolant cavities (e.g., coolant cavity 316 of FIG. 3) formed in the blades 52 extending radially outwardly from the blade ring 52. As the rotor 50 rotates, each inlet 66 ingests air from an airflow traveling across the rotor 50, and the air is directed to the corresponding blade 52. The inlets 66 are formed on a forward surface 60 of the blade ring 52 or alternatively, on an aft surface 62 of the blade ring 52.

Figure 2:
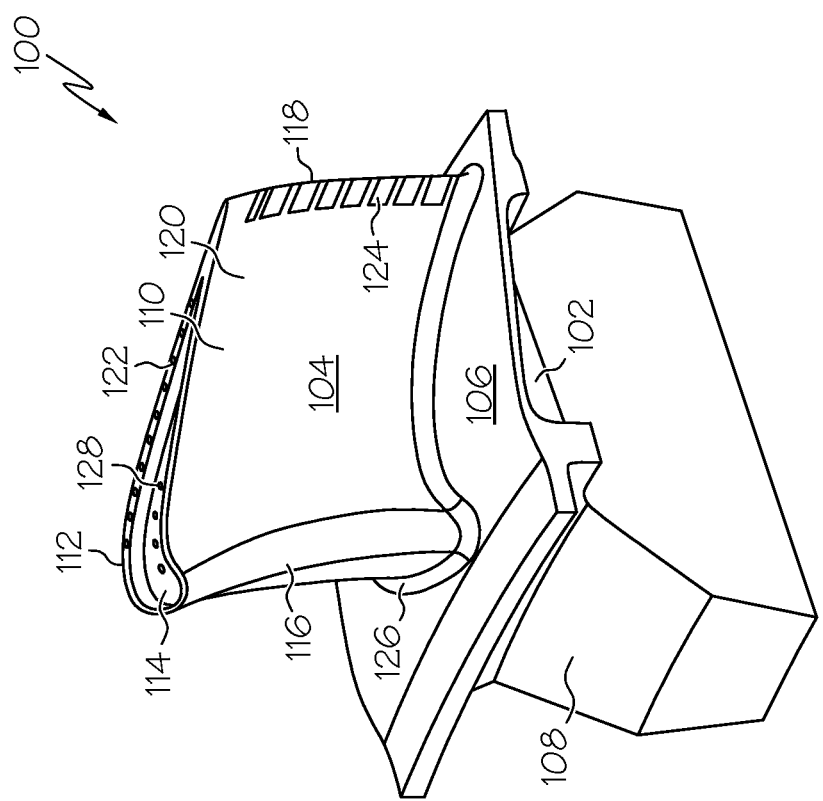
FIG. 2 is a perspective, pressure side view of a turbine blade, according to an embodiment.

FIG. 2 is a perspective, pressure side view of a turbine blade 100, according to an embodiment. The turbine blade 100 may include a shank 102, an airfoil 104, a platform 106, and a root 108. The platform 106 is configured to radially contain turbine airflow received through the inlet 66 (FIG. 1) of the blade ring 52 (FIG. 1). The root 108 is used to attach the turbine blade 100 to the blade ring 52. The root 108 may be machined into any one of numerous other shapes suitable for attaching the turbine blade 100 to the blade ring 52.

The airfoil 104 is generally made up of a concave, pressure side wall 110, a convex, suction side wall 112 opposite the concave, pressure side wall 110, and a tip wall 114 extending between and coupling the pressure sidewall 110 and the suction side wall 112 together. The walls 110, 112, 114 may each have varying thicknesses along their lengths. In an embodiment, the walls 110, 112, 114 may have thicknesses that range between about 0.20 mm and 1.80 mm. In still other embodiments, the walls 110, 112, 114 may each have equal thicknesses, while in other embodiments the walls 110, 112, 114 may each have substantially equal thickness. In any case, the walls 110, 112, 114 have outer surfaces that together define an airfoil shape. The airfoil shape is made up of a leading edge 116, a trailing edge 118, a pressure side 120 along the concave, pressure side wall 110, a suction side 122 along the convex, suction side wall 112, one or more trailing edge slots 124, an airfoil platform fillet 126, and a tip recess cavity 128.

Figure 3:
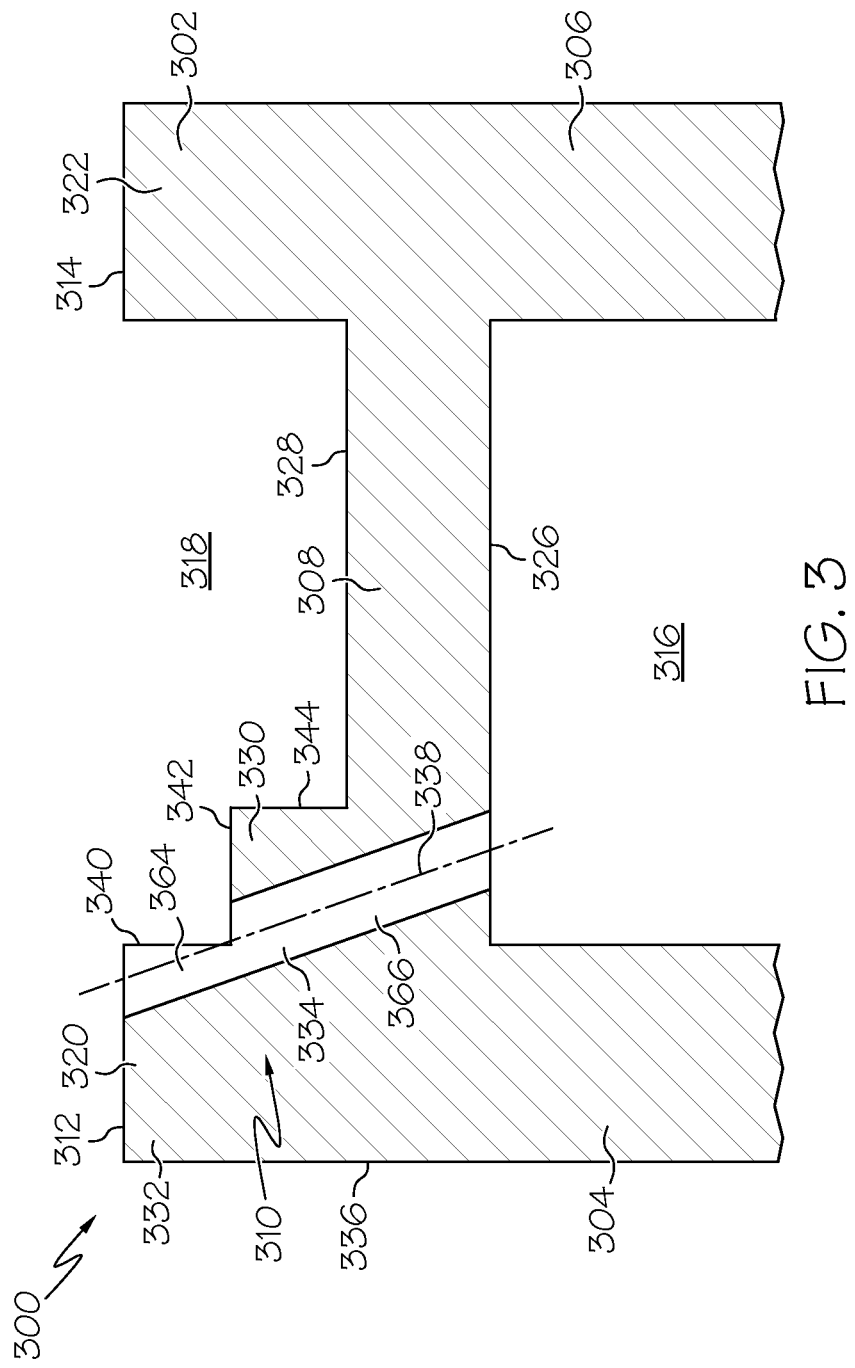
FIG. 3 is a simplified, close up, cross section view of a tip portion of a turbine blade, according to an embodiment.
Figure 4:
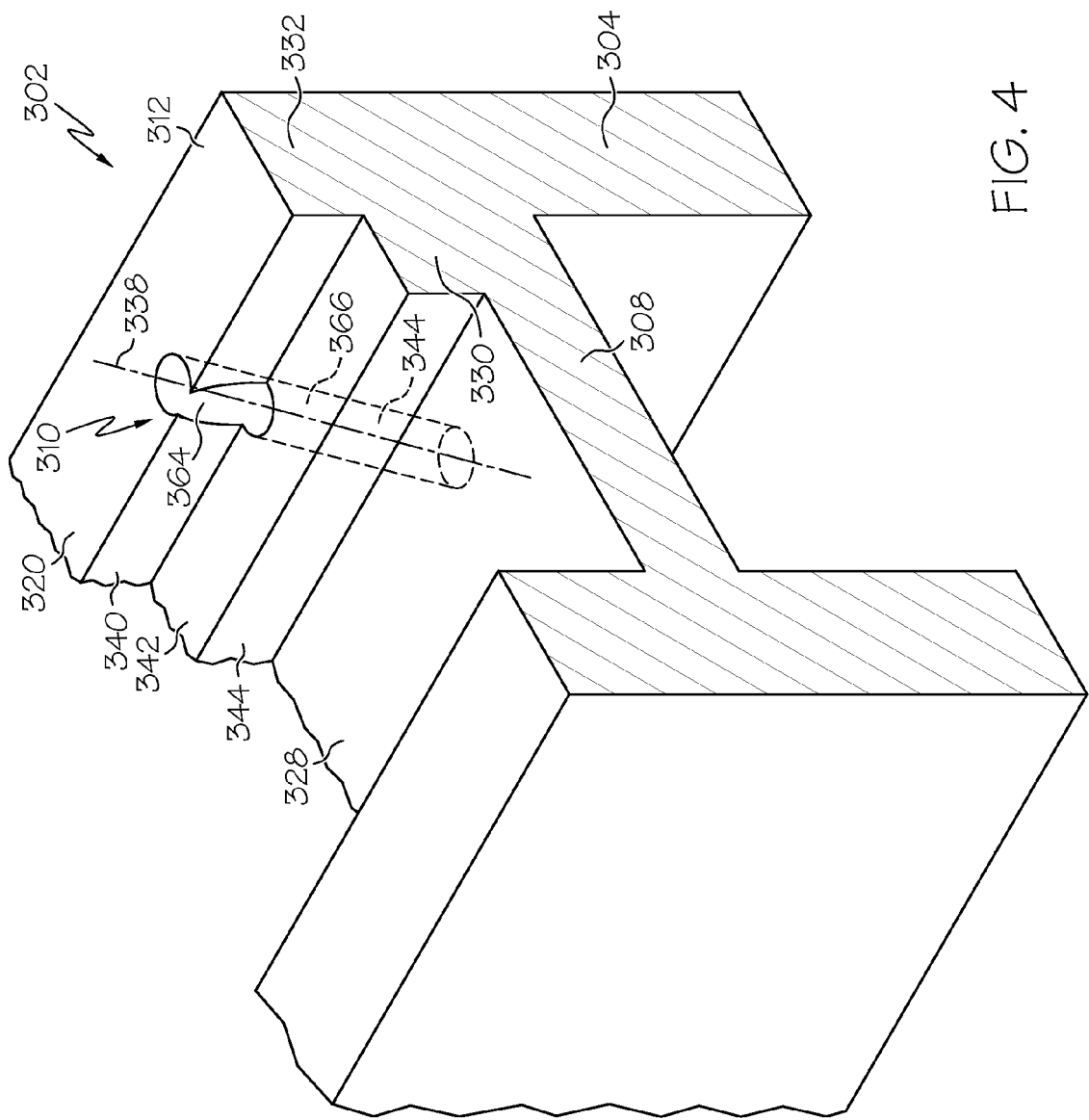
FIG. 4 is a perspective view of a parapet wall of the tip portion of FIG. 3, according to an embodiment.

FIG. 3 is a simplified, close up, cross section view of a tip portion 302 of a turbine blade 300, and FIG. 4 is a perspective view of a first parapet wall 320 of the tip portion 302, according to an embodiment. The tip portion 302 includes a first side wall 304, a second side wall 306, a tip wall 308, and a tip cooling system 310. The first side wall 304 has a first tip edge 312. The second side wall 306 is disposed opposite the first side wall 304 and has a second tip edge 314. The first side wall 304 comprises a convex suction side wall (e.g., convex suction side wall 112 of FIG. 2), and the second side wall 306 comprises a concave pressure side wall (e.g., concave pressure side wall 114 of FIG. 2), in an embodiment. Alternatively, the first sidewall 304 can comprise the concave pressure side wall, and the second side wall 306 can comprise the convex suction side wall.

In any case, the tip wall 308 extends between the first side wall 304 and the second side wall 306 and is recessed a distance from the first and second tip edges 312, 314 to define first and second parapet walls 320, 322 on the first and second side walls 304, 306, respectively. An exposed surface 328 of the recessed tip wall 308, a first parapet wall 320 on the first side wall 304, and a second parapet wall 322 on the second side wall 306 together form a tip recess cavity 318. The parapet walls 320, 322 are substantially equal in height (as measured from the exposed surface 328 of the tip wall 308 to the first and second tip edges 312, 314, respectively), as depicted in FIGS. 3 and 4. Though not illustrated, in another embodiment, one of the parapet walls 320, 322 is shorter than the other so that a height difference exists there between. In such case, by including a shorter wall (e.g., the first parapet wall 320), the turbine blade 300 may be less likely to contact adjacent components during engine operation. Additionally, if employed, the taller wall (e.g., the second parapet wall 322) may shield the shorter parapet wall (e.g., first parapet wall 320) from heat during turbine assembly operation. Suitable height differences between the parapet walls 320, 322 may include measurements between about 0.05 mm and about 0.40 mm. In another embodiment, the height difference may be smaller or larger. One parapet wall 320, 322 may additionally or alternatively be thicker than the other parapet wall 320, 322. In an embodiment, the first parapet wall 320 is about 1.30 to about 2.7 times thicker than the second parapet wall 322. In other embodiments, the difference in thickness and the thickness measurements may be greater or less than the aforementioned ranges. In any case, a coolant cavity 316 is defined in part by an interior surface 326 of the tip wall 308 and the first and second side walls 304, 306.

During operation, as noted above, when the rotor (e.g., rotor 50) rotates, air from an airflow is ingested and directed to a corresponding blade, such as blade 300. Because the radial gap between the rotor and the shroud (e.g., shroud 20 in FIG. 1) is very small, the parapet walls 320, 322 may contact and abrade against a surface of the shroud to thereby reduce cooling of one or more of the parapet walls 320, 322 by either partially or completely blocking the exit of hole 334. To continue to provide cooling to the parapet walls 320, 322 and the tip wall 308 despite abrading, the blade 300 employs the tip cooling system 310, which flows cool air from the internal cooling system of the rotor and the coolant cavity 316 to the tip wall 308 and the parapet walls 320, 322. In this regard, the tip cooling system 310 includes a step 330 and a cooling hole 334.

The step 330 is formed between the first tip edge 312 and the exposed surface 328 of the tip wall 308. Although the step 330 is depicted as being formed on the first parapet wall 320, other embodiments alternatively may include the step 330 on the second parapet wall 322. By including the step 330, the parapet wall 320 is divided into an outer radial section 332 and inner radial section (e.g., the step 330). The outer radial section 332 is defined by the tip edge 312 and an outer axial surface 340. The step 330 is defined by a radial surface 342 and an inner axial surface 344. Although illustrated in FIG. 3 as being substantially orthogonal relative to each other, the outer axial surface 340 and the radial surface 342 are not orthogonal in other embodiments. For example, the two surfaces 340, 342 can be angled relative to each other within a range of about 50 to about 160°.

The outer radial section 312 is configured to contact or have a small radial gap to the shroud (e.g., shroud 20 in FIG. 1) and has a height measured from the step 330 to the tip edge 312 in a range of about 20% to about 80% of a total height of the parapet wall 320. Preferably, the height of the outer radial section 332 is selected such that removal of blade tip material during abrasion minimally affects the desired performance of the inner radial section (i.e., step 330). Thus, the height of the outer radial section 332 can be greater or less than the aforementioned range, in other embodiments. The thickness of the outer radial section 332 is about 35% to about 65% of a total thickness of the parapet wall 320 (the thickness measured from the inner axial surface 344 to an exterior surface 336 of the parapet wall 320), and the inner radial section (i.e., step 330) has a thickness that is equal to the parapet wall 320 total thickness. In other embodiments, the thicknesses are greater or less than the aforementioned ranges.

The cooling hole 334 has a centerline 338 and extends continuously from the parapet wall 320 (e.g., through the outer radial section 332 and the step 330) and the tip wall 308. The cooling hole 334 has an open channel section 364 and a closed channel section 366 (shown in FIG. 3 and depicted in phantom in FIG. 4), wherein the open channel section 364 extends through the outer radial section 332 (e.g., from the first tip edge 312 of the parapet wall 320) to the step 330 and the closed channel section 366 extends through the step 330 toward the interior surface 326 of the tip wall 308. The closed channel section 366 has a first shape continuing to the open channel section 364, such that the open channel section 364 has a second shape that is a portion of the first shape. In the exemplary embodiment illustrated in FIGS. 3 and 4, the closed channel section 366 is cylindrical, and the shape of the closed channel section 366 (i.e., the cylindrical shape) continues to the open channel section 364 to provide the open channel section 364 with a partial cylinder shape. The cylindrical shape has a substantially constant cross section shape, in an embodiment. For example, the cross section shape is a circle. Alternatively, the cross section shape is another shape, such as an oval, a triangle, a different polygon shape, a teardrop, a fan or a different shape. According to an embodiment, the open and closed channel sections 364, 366 have substantially constant dimensions. In such case, the largest dimension of the open and closed channel sections 364, 366 may be in a range of about 0.2 mm to about 0.7 mm. In other embodiments, the largest dimension may be greater or less than the aforementioned range.

As illustrated in the exemplary embodiment of FIG. 3, the centerline 338 can be angled relative to the first tip edge 312. For example, the centerline 338 may be angled such that the cooling hole 334 is angled toward a streamwise direction of an airflow flowing across a surface of the blade 300. As used herein, the term "streamwise direction" is defined as a constant radius line on the surface of the airfoil 300 in the direction of the high temperature compressed air flow. The angle between the centerline 338 and the first tip edge 312 can be in a range of about 40° to about 60°. In another embodiment, the angle is greater or less than the aforementioned range. In yet another embodiment, the cooling hole (e.g., cooling hole 334' shown in phantom) is formed such that a angle between the centerline 338' and the first tip edge 312' is inclined in a direction that is aligned with or opposing the streamwise direction (e.g., compound angle).

Figure 5:
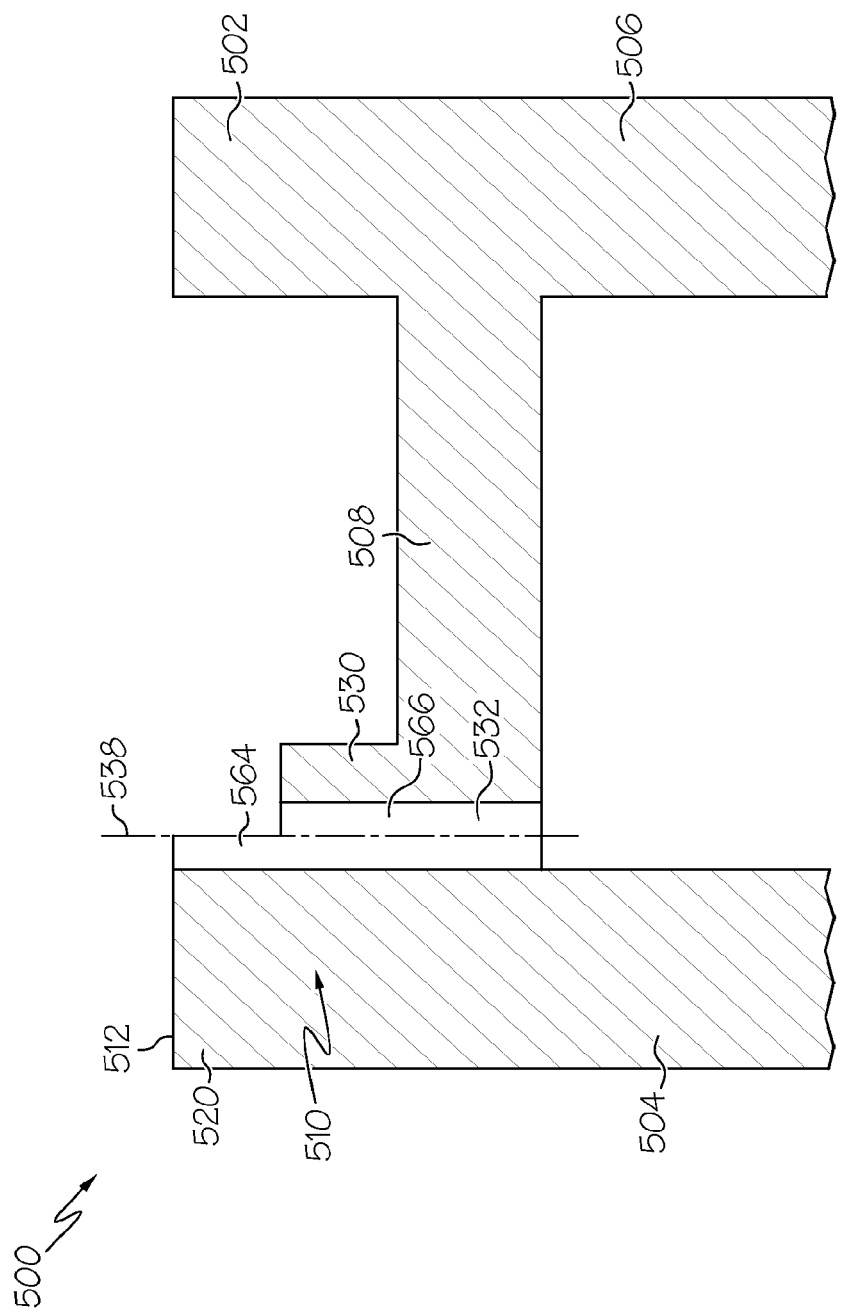
FIG. 5 is a simplified, close up, cross section view of a tip portion of a turbine blade, according to another embodiment.
Figure 6:
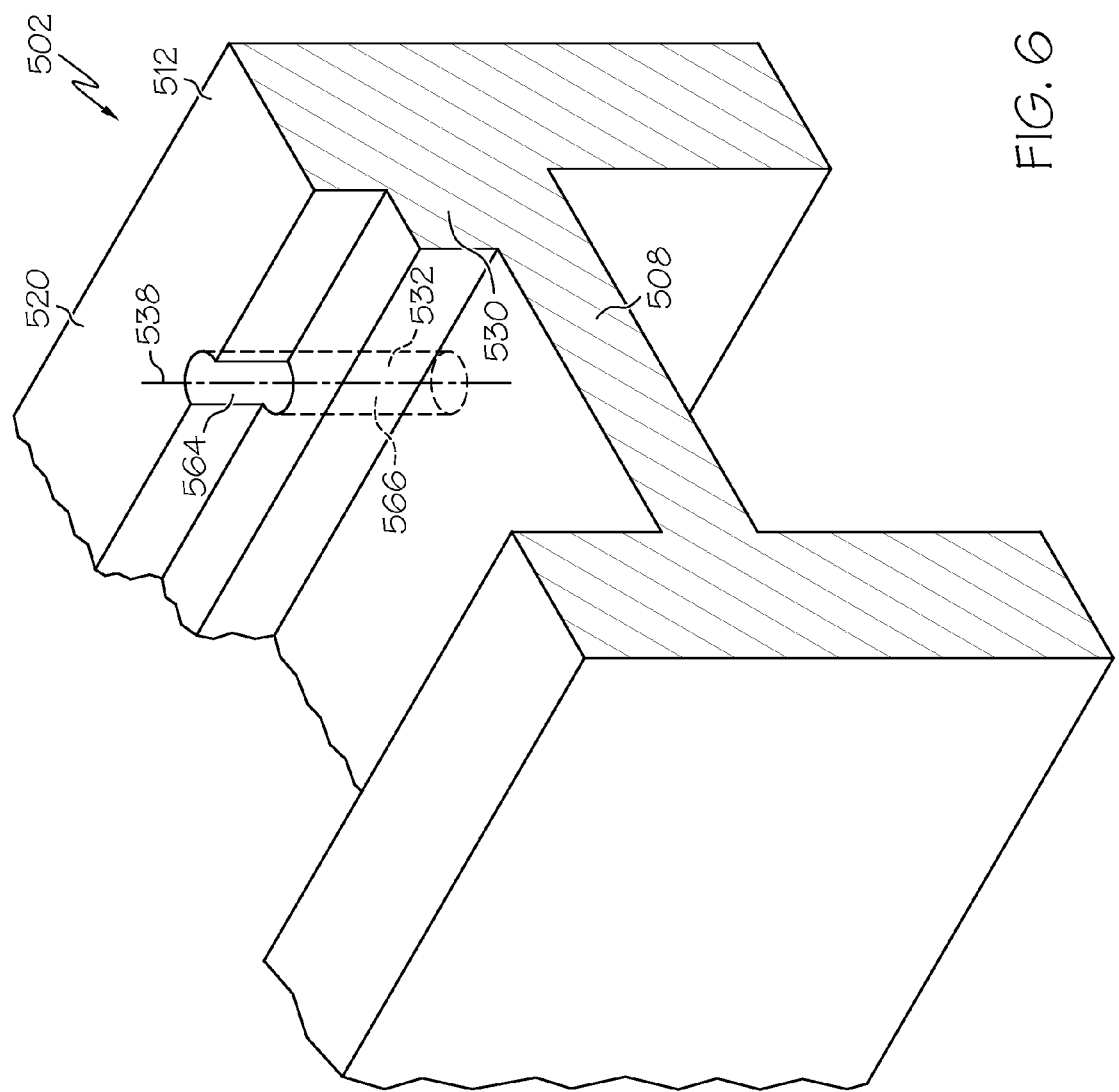
FIG. 6 is a perspective view of a parapet wall of the tip portion of FIG. 5, according to an embodiment.

In another embodiment, the centerline is substantially orthogonal relative to the first tip edge. FIG. 5 is a simplified, close up, cross section view of a tip portion 502 of a turbine blade 500, and FIG. 6 is a perspective view of a first parapet wall 520 of the tip portion 502, according to an embodiment. The tip portion 502 includes the first side wall 504, a second side wall 506, a tip wall 508, and a tip cooling system 510, each formed substantially similar to walls 304, 306, 308 and 310 of FIGS. 3 and 4, except that a centerline 538 of a cooling hole 532 of the tip cooling system 510 is substantially orthogonal relative to first tip edge 512. Additionally, the cooling hole 532 includes open and closed channel sections 564, 566 having substantially constant cross section shapes and dimensions.

Figure 7:
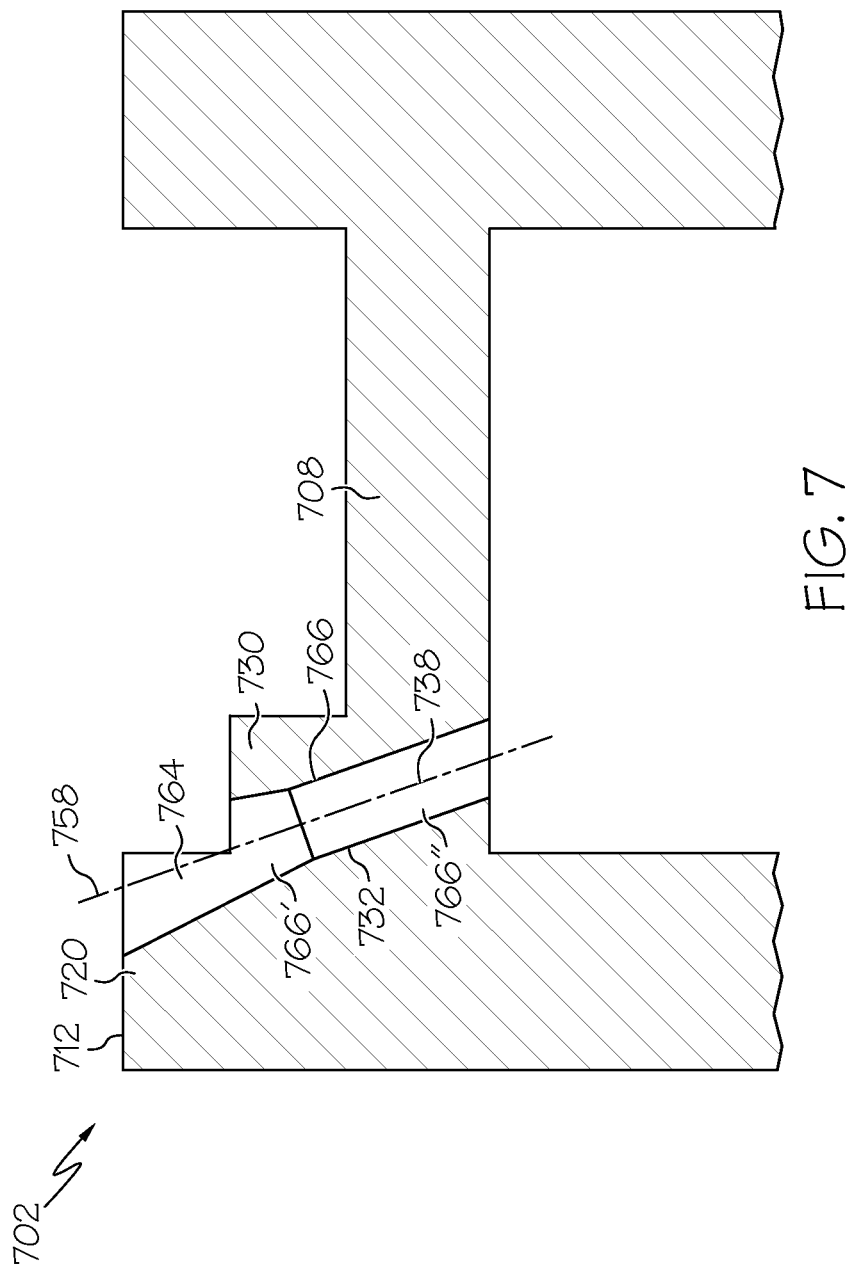
FIG. 7 is a close up, cross section view of a tip portion of a turbine blade, according to still another embodiment.

In still another embodiment, the shape and dimensions of the open and closed channel sections are not constant. FIG. 7 is a close up, cross section view of a tip portion 702 of a turbine blade 700 in which an open channel section 764 and an adjacent portion of a closed channel section (identified in FIG. 7 as closed channel section 766') are shaped differently than another portion of the closed channel section (identified in FIG. 7 as closed channel section 766"). Here, the open channel section 764 and the adjacent portion of the closed channel section 766' form a "diffuser angle section" extending along a centerline 758. As used herein, the term "diffuser angle section" is defined as a channel configuration for diffusing cool air from the coolant cavity (e.g., coolant cavity 316 in FIG. 3) outward toward a tip edge 712. Hence, the shape of the diffuser angle section can be shaped to increase in flow area from the closed channel section 766' to the tip edge 712. Suitable shapes for the diffuser angle section include conical, frusto-conical, and the like. The diffuser angle section can have a cross section having any shape suitable for allowing air to flow, such as oval, circle, fan, teardrop, triangle or another polygon, and the like.

The closed channel section 766 extends along the centerline 738 and has a shape, where the shape of the diffuser angle section is not a portion of the shape of the closed channel section 766. For example, the closed channel section 766 has a cylindrical shape, as illustrated in FIG. 7. In another embodiment, the closed channel section 766 has another shape. For example, the closed channel section has an oval or race-track shape. Although illustrated in FIG. 7 as being constant along its length, the dimensions of the closed channel section 766 can vary in other embodiments. Although centerline 758 is angled relative to centerline 738, both may extend along the same axis in other embodiments.

Figure 8:
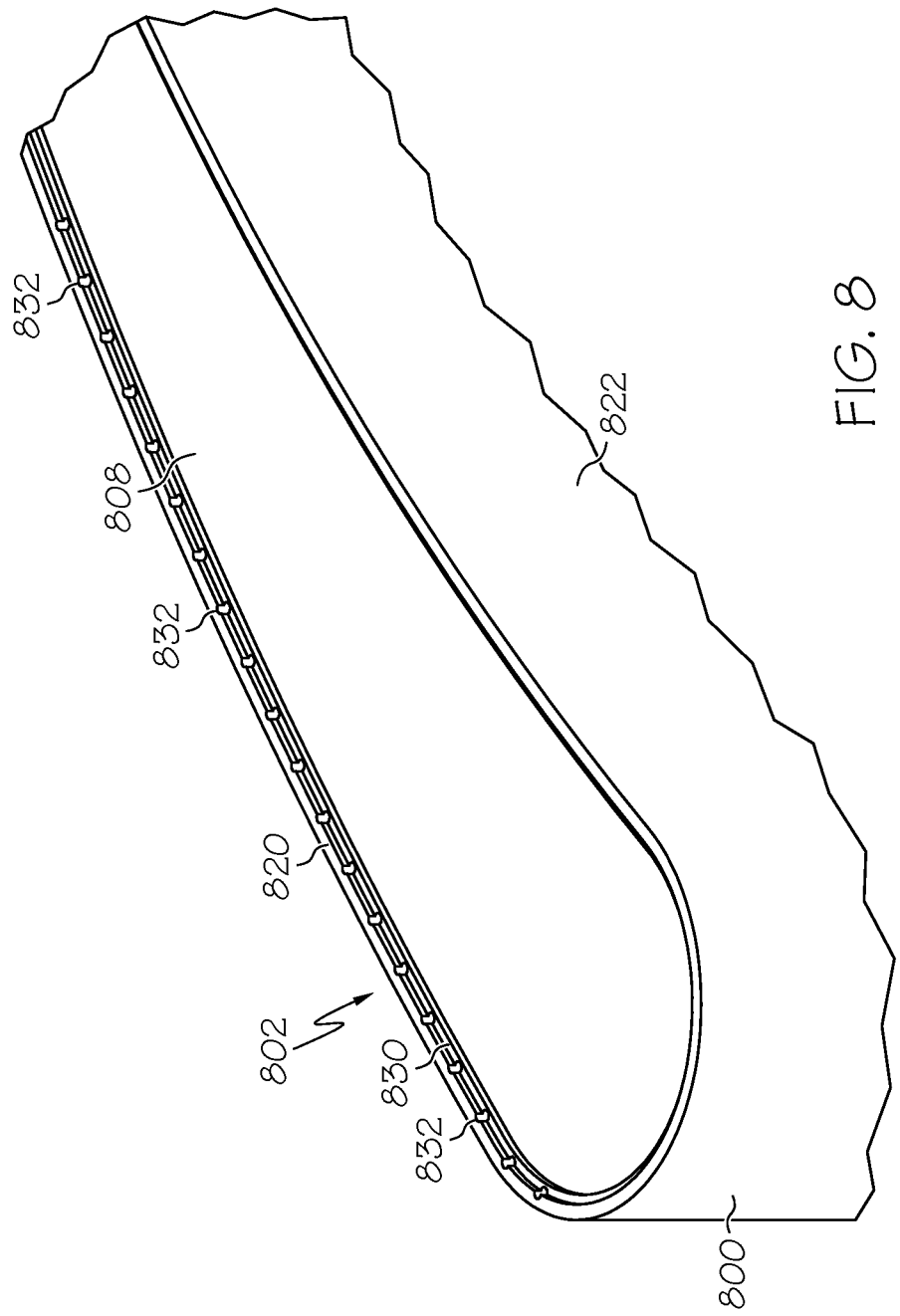
FIG. 8 is a top view of a tip portion of a turbine blade, in accordance with an embodiment.

Turning now to FIG. 8, a top view of a tip portion 802 of a turbine blade 800 is provided, in accordance with an embodiment. The tip portion 802 includes a tip wall 808, a first parapet wall 820, and a second parapet wall 822. A step 830 extends along a length of the first parapet wall 820. As depicted in FIG. 8, the step 830 extends along an entire length of the parapet wall 820. In another embodiment, the step 830 extends along a portion of the length of the parapet wall 820.

A plurality of cooling holes 832 are formed through the first parapet wall 820 including the step 830. Each hole 832 has a largest diameter in a range of about 0.20 mm to about 0.70 mm. In other embodiments, the holes 832 are larger or smaller than the aforementioned range. The cooling holes 832 are substantially evenly spaced apart, in an embodiment. In other embodiments, the cooling holes 832 unevenly spaced apart. In any case, each cooling hole 832 has a largest diameter, and each cooling hole 832 spaced apart a distance from an adjacent cooling hole 832 that is equal to between about three to about eight largest cooling hole diameters. Depending on a total length of the first parapet wall 820, a total number of holes 832 on the first parapet wall 820 can fall within in a range of about 15 to about 25 holes.

To manufacture a blade including the features described above, the blade including a tip portion with parapet walls (e.g., walls 320, 322, 520, 720, 820, 822) and a recessed tip wall (e.g., 308, 508, 708, 808) may be formed by a conventional lost wax casting process. A step (e.g., step 330, 530, 730, 830) is also included in the blade that is formed by the conventional lost wax casting process, in an embodiment. In another embodiment, the step and the holes are electro-discharge machined into the desired parapet wall. In still another embodiment the step and the holes are formed into the desired parapet wall by employing a different fabrication process, such as by laser sintering. Cooling holes (e.g., holes 334, 532, 732, 832) are electrodischarge machined through the parapet wall, in accordance to a desired configuration similar to one described above. In still another embodiment, the hole or the step or both can be machined by laser machining.

A blade has now been provided that has an improved manner for cooling a tip section of the blade. In particular, by including a step in a parapet wall of the blade, and by extending a cooling hole through the parapet wall (including the step) and a tip wall of the blade, cool air from a coolant cavity of the blade can be directed to the tip wall and the parapet wall. Moreover, because a portion of the cooling hole is configured as an open channel section (e.g., groove), air can still be supplied to the parapet wall in an event in which a portion of the parapet wall abrades against the shroud and causes blockage in the hole openings on the outer radial section (eg. 312, 512, and 712).

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A turbine blade, comprising:
a first side wall including a first tip edge;
a second side wall opposite the first side wall and including a second tip edge;
a tip wall extending between the first side wall and the second side wall, the tip wall being recessed from the first tip edge of the first side wall and the second tip edge of the second side wall to form a coolant cavity, a tip recess cavity, a first parapet wall on the first side wall, and a second parapet wall on the second side wall, the coolant cavity defined in part by an interior surface of the tip wall, and the tip recess cavity defined, in part, by a surface of the tip wall, the first parapet wall, and the second parapet wall;
a step formed on only the first side wall, between the first tip edge and the tip wall, the step dividing the first parapet wall into an outer radial section and an inner radial section, the inner radial section defining the step; and
a cooling hole extending through the outer radial section, the step, and the tip wall, the cooling hole including an open channel section and a closed channel section, the open channel section comprising a minority portion of the height of the first parapet wall and extending from the first tip edge of the first parapet wall to the step through only the outer radial section, and the closed channel section extending through the step and the tip wall.

2. The turbine blade of claim 1, wherein the cooling hole has a centerline and the centerline is angled relative to the first tip edge.

3. The turbine blade of claim 2, wherein the centerline is angled relative to the first tip edge at an angle in a range of about 40° to about 60°.

4. The turbine blade of claim 2, wherein the centerline is substantially orthogonal to the first tip edge.

5. The turbine blade of claim 2, wherein the centerline has a compound angle to the first tip edge.

6. The turbine blade of claim 1, wherein the open channel section has a first centerline and a portion of the closed channel section has a second centerline that is angled relative to the first centerline.

7. The turbine blade of claim 1, wherein the closed channel section has a first shape and the open channel section has a second shape that is not a portion of the first shape.

8. The turbine blade of claim 1, wherein a first portion of the closed channel section has a first shape, a second portion of the closed channel section and the open channel section form a second shape that is not a portion of the first shape.

9. The turbine blade of claim 1, wherein the first shape comprises a cylinder, and the second shape comprises a frustoconical shape.

10. The turbine blade of claim 1, wherein the step extends along an entire length of the first parapet wall.

11. The turbine blade of claim 1, wherein the cooling hole comprises a plurality of cooling holes, each cooling hole having a largest diameter, and each cooling hole spaced apart from an adjacent cooling hole a distance that is equal to between about three to about eight largest diameters.

12. A turbine rotor comprising:
   a rotor; and
   a plurality of blades extending radially outwardly from the rotor, each blade comprising:
   a first side wall including a first tip edge,
   a second side wall opposite the first side wall and including a second tip edge,
   a tip wall extending between the first side wall and the second side wall, the tip wall being recessed from the first tip edge of the first side wall and the second tip edge of the second side wall to form a coolant cavity, a tip recess cavity, a first parapet wall on the first side wall, and a second parapet wall on the second side wall, the coolant cavity defined in part by an interior surface of the tip wall, and the tip recess cavity defined, in part, by a surface of the tip wall, the first parapet wall, and the second parapet wall,
   a step formed on only the first side wall, between the first tip edge and the tip wall, the step dividing the first parapet wall into an outer radial section and an inner radial section, the inner radial section defining the step, and
   a cooling hole extending through the outer radial section, the step, and the tip wall, the cooling hole including an open channel section and a closed channel section, the open channel section comprising a minority portion of the height of the first parapet wall and extending from the first tip edge of the first parapet wall to the step through only the outer radial section, and the closed channel section extending through the step and the tip wall.

13. The turbine rotor of claim 12, wherein the first side wall comprises a convex suction side wall and the second side wall comprises a concave pressure side wall.

14. The turbine rotor of claim 12, wherein the first side wall comprises a concave pressure side wall and the second side wall comprises a convex suction side wall.

15. The turbine rotor of claim 12, wherein the rotor includes a plurality of inlets, and each inlet communicates with a corresponding coolant cavity in the blade.

16. A method of manufacturing a turbine blade comprising:
   casting a blade including a first side wall including a first tip edge, a second side wall opposite the first side wall and including a second tip edge, and a tip wall extending between the first side wall and the second side wall, the tip wall being recessed from the first tip edge of the first side wall and the second tip edge of the second side wall to form a coolant cavity, a tip recess cavity, a first parapet wall on the first side wall, and a second parapet wall on the second side wall, the coolant cavity defined in part by an interior surface of the tip wall, and the tip recess cavity defined, in part, by a surface of the tip wall, the first parapet wall, and the second parapet wall;
   forming a step on only the first side wall, between the first tip edge and the tip wall, the step dividing the first parapet wall into an outer radial section and an inner radial section, the inner radial section defining the step; and
   machining a cooling hole into the blade, wherein the cooling hole extends through the outer radial section, the step, and the tip wall, the cooling hole includes an open channel section and a closed channel section, the open channel section comprising a minority portion of the height of the first parapet wall and extending from the first tip edge of the first parapet wall to the step through only the outer radial section, and the closed channel section extends through the step and the tip wall.

17. The method of claim 16, wherein the step of forming the step comprises casting the step with the blade.

18. The method of claim 16 wherein the step of casting comprises performing a lost wax casting process to form the blade.

19. The method of claim 16, wherein the step of forming the step comprises electrodischarge machining the step into the blade.

20. The method of claim 16, wherein the steps of forming the step and machining the cooling hole comprise laser sintering the step and the cooling hole into the blade.

\* \* \* \* \*